No. 885,294. PATENTED APR. 21, 1908.
C. T. RICHMOND.
BATTERY FILLING MACHINE.
APPLICATION FILED SEPT. 14, 1905.

3 SHEETS—SHEET 1.

Witnesses.
E. B. Gilchrist
W. L. McGarrell

Inventor.
Charles T. Richmond,
By his Attorney,
Thurston Bates

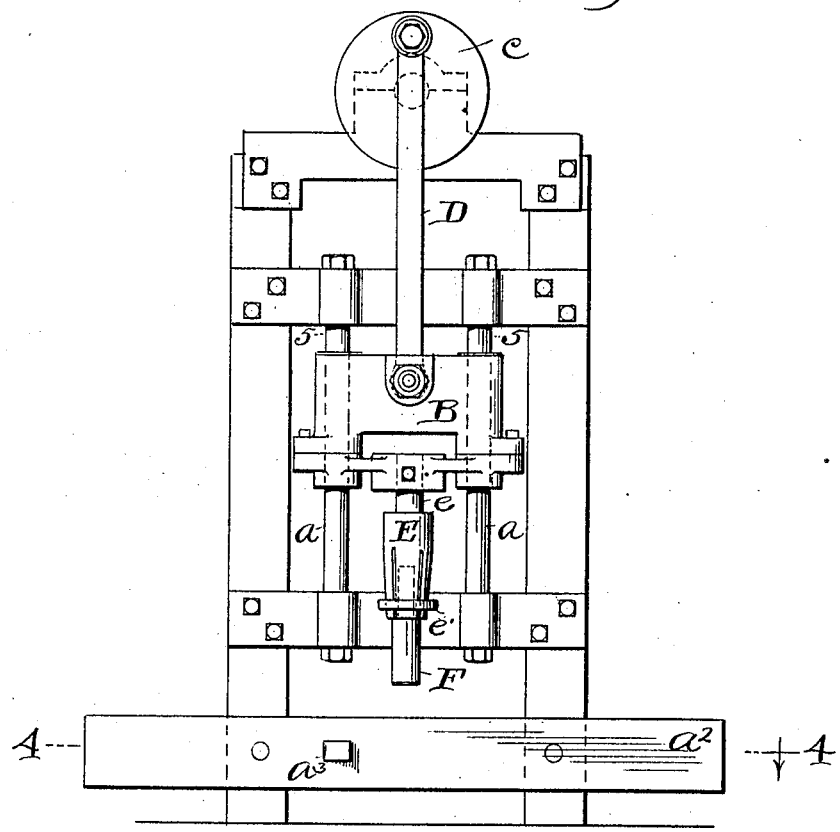

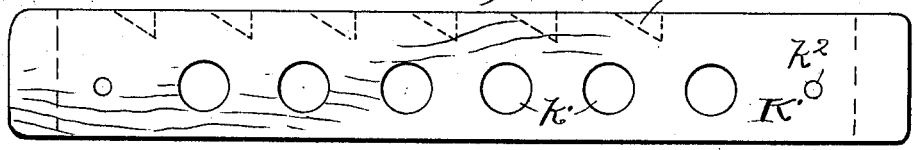
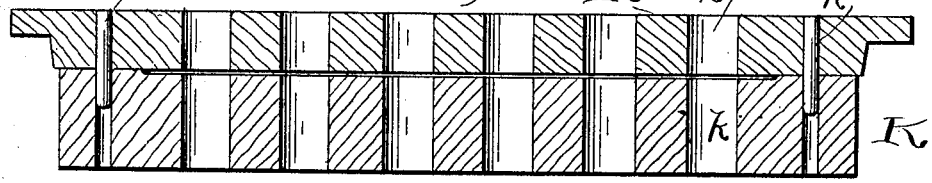
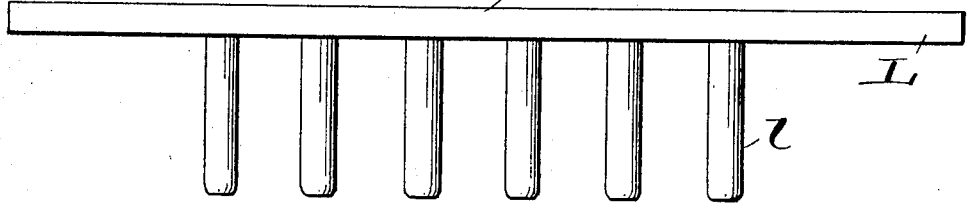
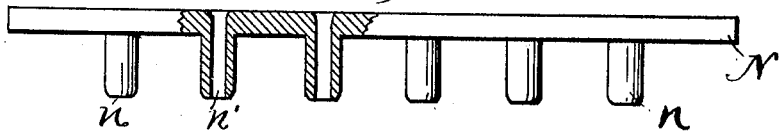
 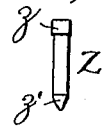 

UNITED STATES PATENT OFFICE.

CHARLES T. RICHMOND, OF CLEVELAND, OHIO, ASSIGNOR TO THE NATIONAL CARBON COMPANY, OF TRENTON, NEW JERSEY, A CORPORATION OF NEW JERSEY.

BATTERY-FILLING MACHINE.

No. 885,294.      Specification of Letters Patent.      Patented April 21, 1908.

Application filed September 14, 1905. Serial No. 278,387.

*To all whom it may concern:*

Be it known that I, CHARLES T. RICHMOND, a citizen of the United States, residing at Cleveland, in the county of Cuyahoga and State of Ohio, have invented a certain new and useful Improvement in Battery-Filling Machines, of which the following is a full, clear, and exact description, reference being had to the accompanying drawings.

The object of this invention is to provide a simple and efficient mechanism for making dry batteries, particularly such small batteries as are used for pocket electric lights and similar purposes. The essential characteristics of the machine are hereinafter more fully described and summarized in the claims.

Figure 1:
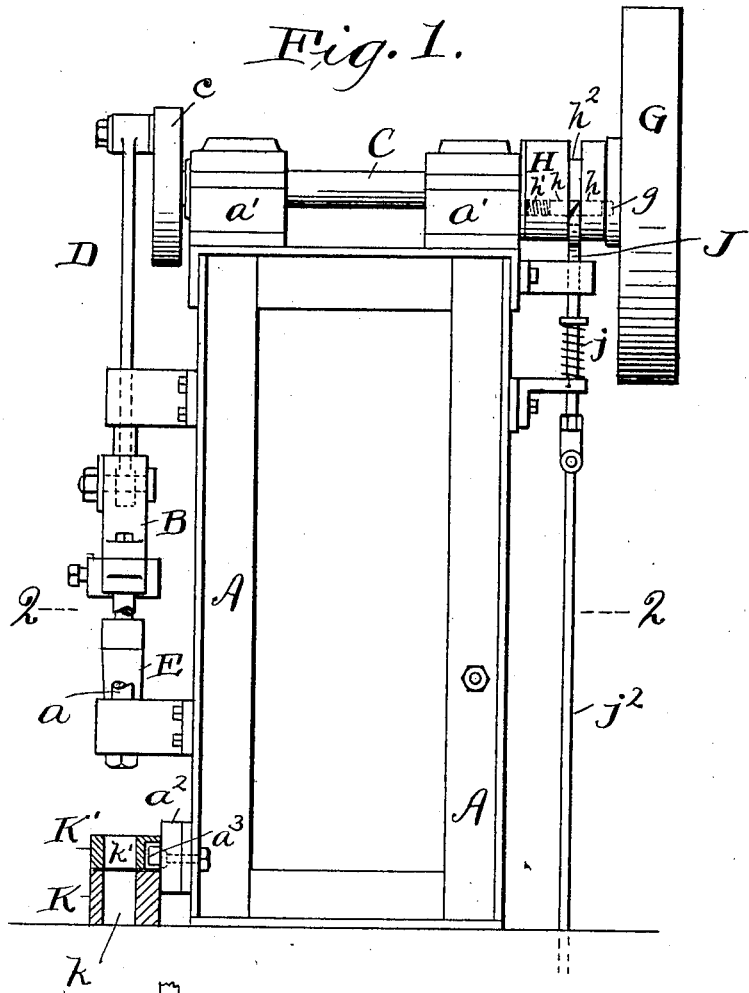
Figure 2:
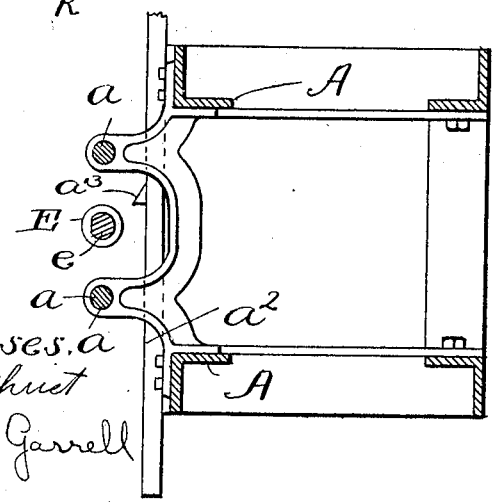

In the drawings Figure 1 is a side elevation of the machine. Fig. 2, is a horizontal section on the line 2—2 of Fig. 1. Fig. 3 is a front elevation. Figs. 4 and 5 are horizontal sections on the correspondingly numbered lines of Fig. 3. Figs. 6 and 7 are respectively a plan and a vertical section of the holder for the battery cups. Fig. 8 is a side elevation of the plunger for packing the filling. Fig. 9 is a side elevation of the holder for the carbon rods. Figs. 10, 11 and 12 are views of the battery,—Fig. 10 showing the cups with its paper lining; Fig. 11, the carbon electrode, and Fig. 12, the complete cell.

Referring to the parts by letters, A represents a suitable frame which has on its forward side guides $a$ for a suitable crosshead B and on its upper end journal boxes $a'$ for a main driving shaft C. A crank $c$ on this shaft is connected by a pitman D with the crosshead. Removably clamped to the cross head is the shank $e$ of the spring chuck E, in which the plunger F is held by means of the clamping ring $e'$ engaging and compressing the tapered exterior of the chuck.

Loosely journaled on the shaft C is a belt pulley G, and a suitable clutch is provided for coupling this when desired with the shaft. This clutch may consist of a bolt $h$ occupying a recess in the collar H, which is rigid with the shaft, the bolt being pressed toward the pulley G by a spring $h'$. There is a recess $g$ in the side of the pulley hub which this bolt is adapted to enter, thereby locking the two together. Occupying a circumferential groove $h^2$ on the collar H is a yoke-piece J which is pressed upward by a spring $j$ and has a pointed upper end adapted to normally engage an inclined projection of the bolt $h$ and prevent the same locking with the pulley G. When the yoke J is drawn down however, as it may be by a treadle (not shown) connected by the lower end of the rod $j^2$, the bolt is pressed towards the pulley and as the notch in the latter comes opposite the bolt, the bolt springs into the notch, and the shaft C is thus caused to rotate and reciprocates the plunger until the pressure is removed from the treadle.

K represents the cup holder which may be a long block of wood having vertical holes $k$ in it, each adapted to receive one of the zinc cups. Surmounting the holder K is a plate K' having holes $k'$ adapted to register with the holes $k$ and having dowel points $k^2$ to preserve such registration. After the cups X with their paper lining Y, have been placed in the holder K, the plate K' is put in place and the holes $k'$ are filled with suitable battery filling preparation. Then the member L having projecting pins $l$ of a diameter smaller than the cups, is placed over the plate K' and forced downward forcing the material in the holes $k'$ into the cups and giving it a preliminary packing. Then the holder with the surmounting plate K' is placed beneath the plunger F. On the rear side of the holder are a series of notches $k^3$. Secured to the forward legs of the machine is the flat cross bar $a^2$ having on it an inclined projection $a^3$ so positioned that when one of the notches $k^3$ engages it, the plunger F is directly over one of the holes $k$. At the beginning of the operation, the holder is placed with its first notch $k^3$ in engagement with the projection $a^3$ and the treadle is depressed, allowing the plunger to descend into the first hole $k'$ $k$, packing the material in the cup. Then as the plunger recedes and clears the holder, the latter is shoved lengthwise one tooth so that the plunger on its next descent enters the next hole. This operation is continued until all the cups have been packed.

By having the projection $a^3$ and the notches $k^3$ beveled on one face as shown, it is easy for the holder to be fed longitudinally and brought accurately into position for each operation. As the plunger recedes, the holder being drawn slightly forward, is then shoved to the left, a distance something less than the distance between consecutive notches, and then by being shoved rearward the incline of the projection $a^3$ engages the incline of the notch $k^3$, and the lengthwise and rearward pressure results in the holder being brought accurately into place.

After the cups have been packed, the member N shown in Fig. 9, consisting of a bar with a series of depending tubular nipples $n$, is brought into action. In the bore $n'$ of each nipple is placed the carbon Z for the battery, which, as shown, may have a brass cap $z$, and be pointed at its end $z'$. This holder with the carbons in place, is put on top of the plate K', with the nipples depending into the openings $k'$. Then a plunger adapted to enter the bore $n'$ is substituted for the plunger F (or the holder is passed onto a similar machine with a smaller plunger) and this plunger descends successively through the different bores $n'$ forcing the carbon down into the material in the cup, thereby completing the operation and producing the battery shown in Fig. 12, wherein X represents the zinc cup, Y the paper lining, Z the carbon element, and W the battery filler.

By the above described machine, the cups are filled rapidly and regularly. The right amount of the filling material is supplied to the cell and it is packed with the desired pressure. The inserting of the pointed carbon by pressure into the mixture is a simple and efficient operation and insures a close contact between the carbon and mixture as well as adding to the tight packing of the latter.

Having thus described my invention, I claim:

1. In a battery filling machine, the combination of a holder for the cup, a surmounting holder for a substance to enter the cup, a plunger to force the substance into the cup said holder for the substance being positioned relative to the holder for the cup so that the substance forced into the cup is guided by the holder therefor until it enters the cup.

2. In a battery filling machine, the combination of a holder for the cup, a surmounting holder for a substance to enter the cup, a plunger to force the substance into the cup, mechanism for causing the plunger to reciprocate, and a guide for the holder said holder for the substance being positioned relative to the holder for the cup so that the substance forced into the cup is guided by the holder therefor until it enters the cup.

3. In a battery filling machine, the combination with a holder adapted to hold a plurality of battery cups, a member having tubular nipples adapted to hold carbons within the bores of the nipples, and means for holding the nipples in alinement with the cups.

4. In a battery filling machine, the combination with a holder adapted to hold a plurality of battery cups, a member having tubular nipples adapted to hold carbons within the bores of the nipples, a plunger adapted to force the carbons from the nipples into the material in the cups, and a guide for the holder in coöperative relation with the plunger.

5. In a battery filling machine, the combination of a member having a series of openings each adapted to receive a battery cup, a surmounting member having registering openings through which the cups may be filled, a member having tubular nipples adapted to enter the last mentioned openings, the bore of the nipples being adapted to carry carbons, a reciprocating plunger, and means for guiding the holder and members mentioned in relation to the plunger, to successively force the carbons through the nipples into the material in the cups.

6. In a battery filling machine, the combination of a holder for the filled cup, a holder and guide for the carbon electrode, and means for forcing said carbon electrode into the material in the cup.

7. In a battery filling machine, the combination of means for packing the mixture in the cup, means for guiding a carbon into the cup, and means for forcing such carbon into the mixture.

8. A holder for a series of battery cups, a surmounting member for guiding loose filling into the cups in the holder, a second surmounting member for carrying carbons and guiding them into the cups while in the holder, and means for forcing such carbons into the filling.

9. In a battery filling machine, the combination of a holder having a series of openings to receive battery cups in alinement, and having a series of notches, one corresponding to each cup, a plunger, means for causing it to reciprocate, and a guide plate for the holder associated with the plunger and having a projection adapted to engage any of said notches.

10. The combination with a supporting frame, guides carried thereby, a cross head reciprocating on said guides, means for driving the cross head, a chuck carried by the cross head, a plunger held by said chuck, a guide plate carried by the frame of the machine below the plunger, a holder for the battery cups having a series of openings in alinement, and a projection and coöperating notches, one on the holder and the other on the guide plate, there being as many notches as there are openings for the cups in the holder.

11. The combination of a member having a series of openings in alinement adapted to carry battery cups, a surmounting member having alined openings adapted to form a filling guide for the cups, a plunger, a frame for carrying it, means for rceiprocating the plunger, a guide carried by the frame, a projection and coöperating notches, one on the frame and the other on one of said members.

In testimony whereof, I hereunto affix my signature in the presence of two witnesses.

CHARLES T. RICHMOND.

Witnesses:
  E. L. Thurston,
  E. B. Gilchrist.